United States Patent [19]

Mason

[11] Patent Number: 5,143,322
[45] Date of Patent: Sep. 1, 1992

[54] GROUND HANDLING, ALTITUDE CONTROL AND LONGITUDINAL STABILITY OF AIRSHIPS

[76] Inventor: Earl W. Mason, 5460 White Oak Ave. A232, Encino, Calif. 91316

[21] Appl. No.: 640,585

[22] Filed: Jan. 14, 1991

Related U.S. Application Data

[63] Continuation-in-part of Ser. No. 569,555, Aug. 20, 1990, abandoned, which is a continuation of Ser. No. 332,163, Apr. 3, 1989, abandoned.

[51] Int. Cl.[5] .............................................. B64B 1/06
[52] U.S. Cl. ................................................... 244/96
[58] Field of Search ...................... 244/96, 97, 98, 127, 244/128, 30, 75 R; 364/463; 73/802; 177/136

[56] References Cited

U.S. PATENT DOCUMENTS

| | | | |
|---|---|---|---|
| 970,262 | 9/1910 | Parseval | 244/93 |
| 1,345,417 | 7/1920 | Truscott | 244/128 |
| 1,577,756 | 3/1926 | Reagan | 244/97 |
| 1,653,904 | 12/1927 | Hall | 244/97 |
| 1,797,502 | 3/1931 | Hall | 244/97 |
| 1,902,519 | 3/1933 | Powelson et al. | 244/97 |
| 1,925,133 | 9/1933 | Burgess | 244/97 |
| 3,180,590 | 4/1965 | Fitzpatrick | 244/30 |
| 3,185,411 | 5/1965 | Gembe | 244/30 |
| 3,533,578 | 10/1970 | Lesh | 244/30 |
| 4,402,475 | 9/1983 | Pavlecka | 244/96 |

FOREIGN PATENT DOCUMENTS

| | | | |
|---|---|---|---|
| 3620485 | 11/1971 | Fed. Rep. of Germany | 244/29 |
| 502438 | 2/1920 | France | 244/94 |
| 284638 | 2/1928 | Italy | 244/97 |

*Primary Examiner*—Galen Barefoot

[57] ABSTRACT

The present invention relates to methods for ground handling, controlling the altitude and for increasing the longitudinal stability of airships. The invention involves an airship hull or envelope to enclose air-filled ballonets and a lifting gas. The buoyancy obtained may be changed by varying the air pressure in the ballonets, thus forcing compression or allowing expansion of the lifting gas. Suitable air pump and valve means are provided to allow two different levels of pressure differential in the ballonets. The buoyancy of the airship is decreased during ground handling and during descent and increased during climb. The airship cruise altitude is slightly above pressure height.

6 Claims, 3 Drawing Sheets

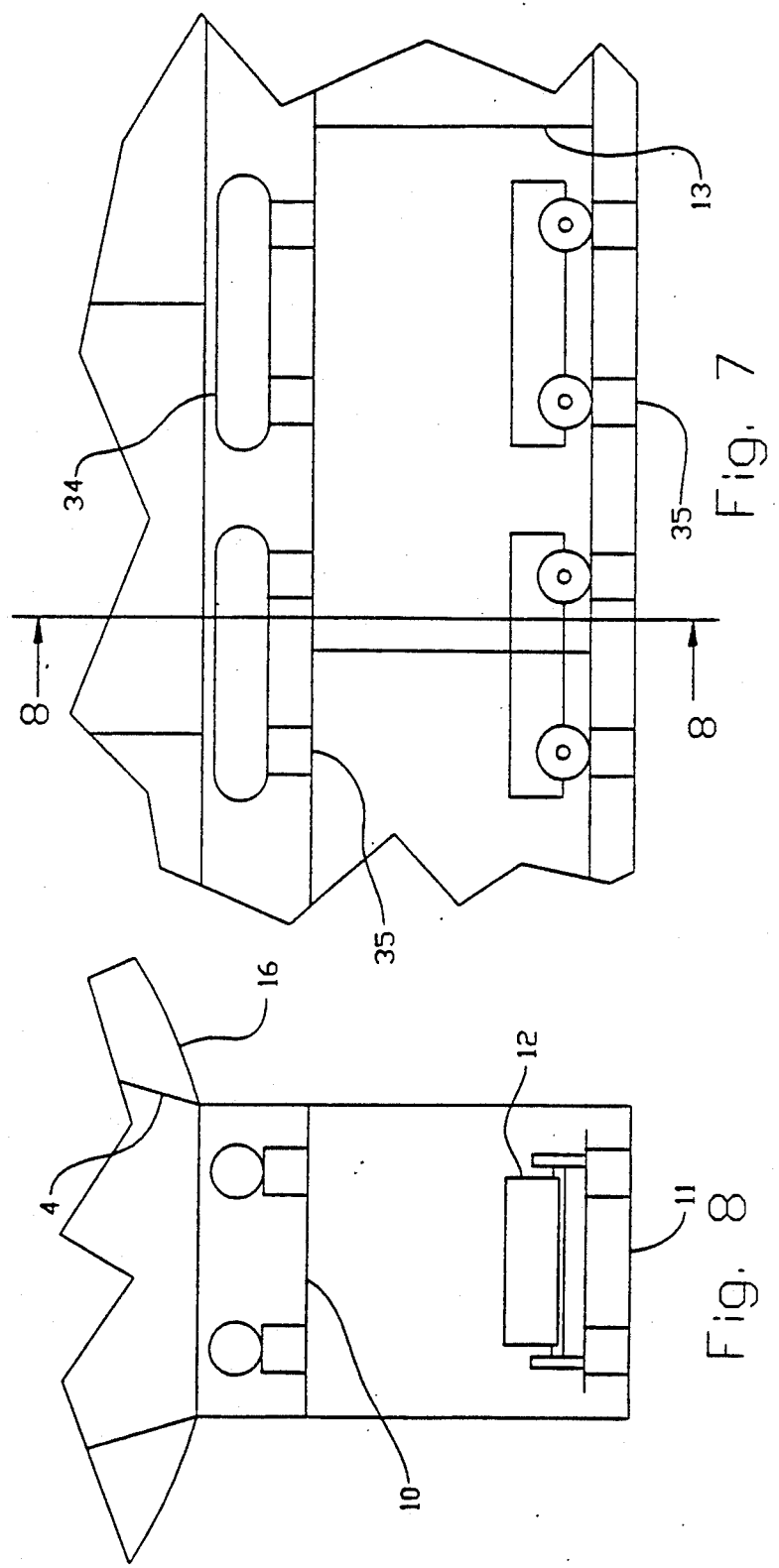

GROUND HANDLING, ALTITUDE CONTROL AND LONGITUDINAL STABILITY OF AIRSHIPS

This application is a continuation-in-part of Ser. No. 569,555, filed Aug. 20, 1990, now abandoned which was a continuation of Ser. No. 332,163, filed Apr. 3, 1989, now abandoned.

FIELD OF THE INVENTION

The present invention relates to methods for improving the ground handling, the altitude control and the longitudinal stability of airships. These aircrafts are also known as dirigibles, blimps or zeppelins. In general, non-rigid, pressurized airships such as blimps have an envelope formed of flexible material and embody a single large cell for receiving and holding the hydrogen, helium or other buoyant gas employed. Rigid, non-pressurized airships such as zeppelins have a rigid framework covered with fabric and the framework contains a number of buoyant gas-filled cells.

BACKGROUND OF THE INVENTION

Airship development began with non-rigid, pressurized airships. However, the efficiency of the airship increases markedly with increasing size. When larger airships were required, they were built using the rigid, non-pressurized design This was necessary because there were no materials available at that time that were suitable for large, non-rigid pressurized airship envelopes. The rigid non-pressurized airship design allows the use of different materials for the envelope and the gas cells. With modern materials, such as aramid fiber cloth and neoprene rubber, large, non-rigid, pressurized airships can be built and the many advantages to this type of design can be utilized.

The rigid airship is very heavy, with the weight of the structure, gas cells and outer envelope weighing about 70% of the gross lift. This can be accomplished in the non-rigid design for about 35% of the gross lift. This, of course, results in a corresponding increase in the payload. The possibility of structural failure is also much more likely to occur with a rigid airship.

The single cell design was chosen because the multi-cell design adds much complication and very little advantage. The airship is generally in balance and has little capability to increase the lift available or decrease the lift required. The failure of a single cell on a multi-cell airship will, therefore, cause the airship to descend. Also, the single cell airship has been flying for many years, and this type of accident has not been a problem. Excessive pressure from surging of the lifting gas from one end of the airship to the other could be a problem if the pitch attitude is allowed to change. The present invention eliminates this possibility by providing for large static longitudinal stability.

One of the main obstacles to airship development has been the lack of a practical and reliable method of controlling the altitude of the airship and of having adequate control during the critical phases of take-off, landing and ground handling.

Most airships prior to the present invention have used changes in the pitch attitude to produce positive or negative lift through aerodynamic forces on the airship hull to vary the altitude.

In order to prevent the required longitudinal control forces from becoming excessive, it was necessary to design for a low static and dynamic longitudinal stability. As a result of this low longitudinal stability, unexpected updrafts and down-drafts caused these airships to pitch up or down and to exceed the altitude envelope limits of the ground and pressure height before the crew could regain control.

The large rigid airships were more vulnerable to this type of accident because they generally had a greater length to diameter ratio than the non-rigids. A cylinder is unstable when traveling against the wind in the direction of its major axis.

The large rigid airships were kept inside large buildings while on the ground, and many accidents occurred while bringing the airships in and out of these buildings.

The present invention provides adequate stability and control of the airship during all phases of flight and while on the ground.

PRIOR ART

A search in the United States Patent Office has revealed the following patents:

| REFERENCES CITED | | | |
|---|---|---|---|
| UNITED STATES PATENTS | | | |
| 1,577,756 | 3/1926 | Regan | 244/97 |
| 1,925,133 | 9/1933 | Burgess | 244/97 |
| 3,180,590 | 4/1965 | Fitzpatrick | 244/30 |
| 3,185,411 | 5/1965 | Gembe | 244/30 |
| 3,533,578 | 10/1970 | Lesh | 244/30 |
| 4,402,475 | 9/1983 | Pavlecka | 244/96 |
| FOREIGN PATENTS OR APPLICATIONS | | | |
| 284,638 | 2/1928 | Robiola | 244/97 |
| 502,438 | 2/1920 | Zodiac | 244/94 |
| 3,620,485 | 11/1971 | Gelhard | 244/29 |

Each of the patents discloses an airship design which is subject to the limitations and disadvantages described above. Thus, none of the prior art airship designs has been entirely satisfactory.

OBJECTS AND ADVANTAGES OF THE INVENTION

An object of the present invention is to provide an improved non-rigid, single cell, pressurized airship with ballonets along the side, a cargo compartment and a water ballast compartment suspended along the length of the envelope by catenary curtains, engines to provide motor power and means to determine the combined weights of the cargo and the water ballast, herein defined as the lift required.

Another object of the invention is to provide an air pump, check valve and a low pressure relief valve to maintain the ballonets at a pressure differential, up to the pressure height that will maintain the lift available greater than the lift required. This will enable the airship to maintain rigidity and to ascend for take-off and climb to cruise altitude.

A further object of the invention is to provide an air pump, check valve and a high pressure relief valve to maintain the ballonets at a pressure differential that will maintain the lift available less than the lift required. This will enable the airship to descend from cruise altitude and to remain on the ground after landing.

An additional object of the invention is to provide the airship envelope with sufficient strength to enable the airship to operate above pressure height. This will provide the airship with cruise altitude stability. The airship will return to cruise altitude after the updrafts and downdrafts end.

Another object of the invention is to provide the airship with large static longitudinal stability by placing the airship center of gravity far enough below the airship center of lift to create a large restoring moment. This will minimize the effect of updrafts and downdrafts on the airship pitch attitude.

DETAILED DESCRIPTION OF THE DRAWINGS

On FIG. 2, 1 is the ballonet, with one on each side of the envelope. On FIG. 1, 2 is the forward bulkhead and 8 is the rear bulkhead. As also shown on FIG. 1, 3 is the catenary curtain, one on each side of the envelope; 4 is the cables connecting the water ballast compartment to the catenary curtains; 5 is the rudder and 6 is the vertical stabilizer; 7 is the nose cone and 9 is the tail cone 10 is the water ballast compartment; 11 is the cargo compartment and 12 is the cargo; 13 is the cables connecting the water ballast compartment to the cargo compartment 14 is the engine, one on each side of the airship; 15 is the control cabin, and 16 is the envelope, composed of multi-layers of materials such as aramid fiber cloth and neoprene rubber.

On FIG. 3, 17 is an emergency pressure relief valve for the lifting gas; 18 and 19 are pressure relief valves for the ballonets with valve 18 set at a higher relief pressure than 19. Valve 19 is adjusted to the pressure needed to supply the envelope with the proper rigidity. 20 is an air shutoff valve. 21 is an air check valve. 22 is an air pump.

On FIG. 4, 24 is the lift available up to altitude 29 with valve 20 on FIG. 3 open; 26 is the lift available up to altitude 31 with valve 20 on FIG. 3 closed; 25 is the lift required and it is necessary to vary the weight of the water in the water ballast compartment to keep the total of the weight of cargo and the ballast at a predetermined amount; 29 is the altitude with the ballonets empty or the pressure height; 30 is the altitude with the ballonets empty and the airship ascended to the altitude where the lift available is decreased to the lift required; 27 is the variation of the lift available after the ballonets are empty at 29.

On FIG. 5 and FIG. 6, 33 is the gross lift of the airship and would be located at the center of the lifting gas; 32 is the total weight of the airship, including the weights of the envelope, water ballast compartment, cargo compartment, empennage and engines. It would be located at the center of gravity of these items.

FIG. 7 is a longitudinal sectional view of the airship's water ballast and cargo compartment, 13 is the cable compartment; 34 is the water ballast tank; 35 is the force transducers in the water ballast compartment and in the cargo compartment.

FIG. 8 is a cross sectional view of the airship's water ballast and cargo compartments, 10 is the water ballast compartment; 11 is the cargo compartment; 12 is the cargo; 4 is the cables connecting the water ballast compartment to the catenary curtains and 16 is the envelope.

FIG. 9 is an electrical schematic, 35 is the force transducer; 36 is the gauge located in the control cabin and 37 is the battery.

DETAILED DESCRIPTION OF THE INVENTION

Figure 1:
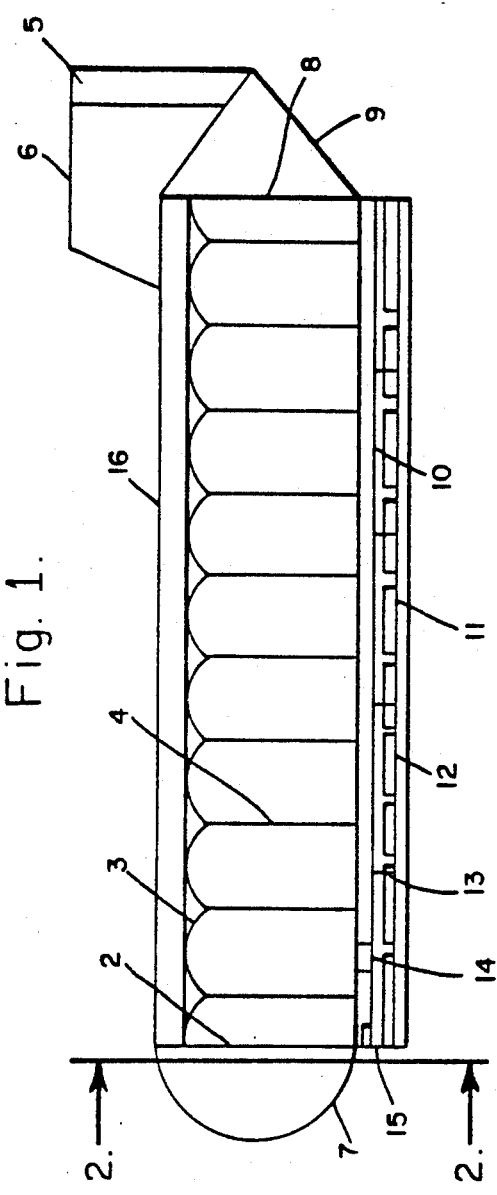
Figure 2:
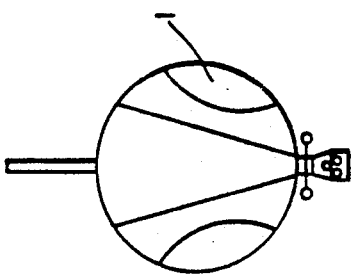
Figure 5:
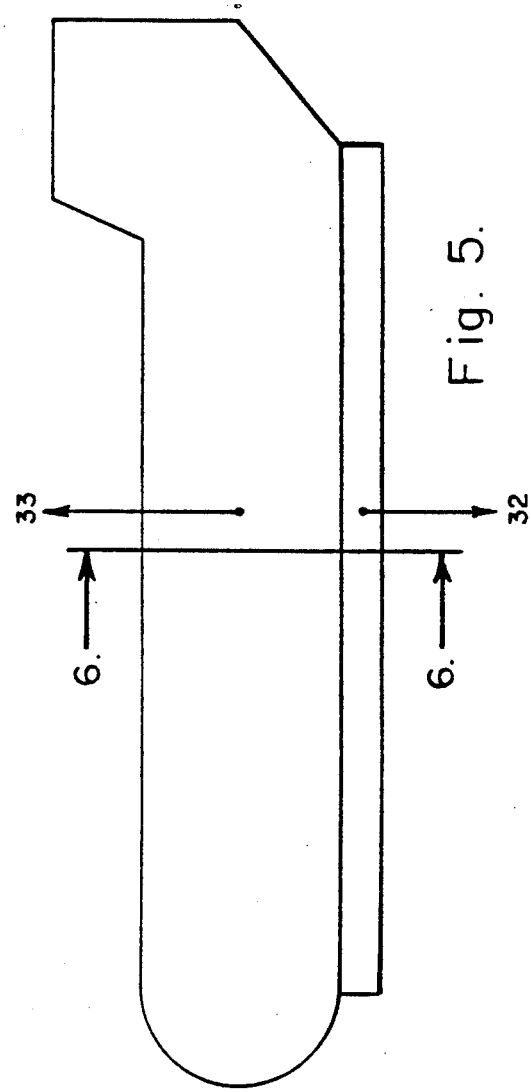
Figure 6:
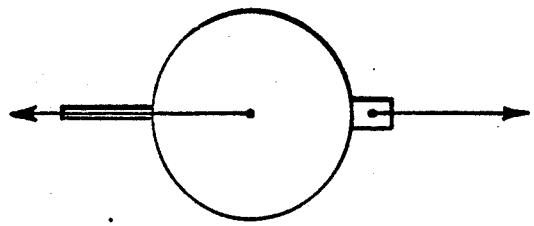
Figure 3:
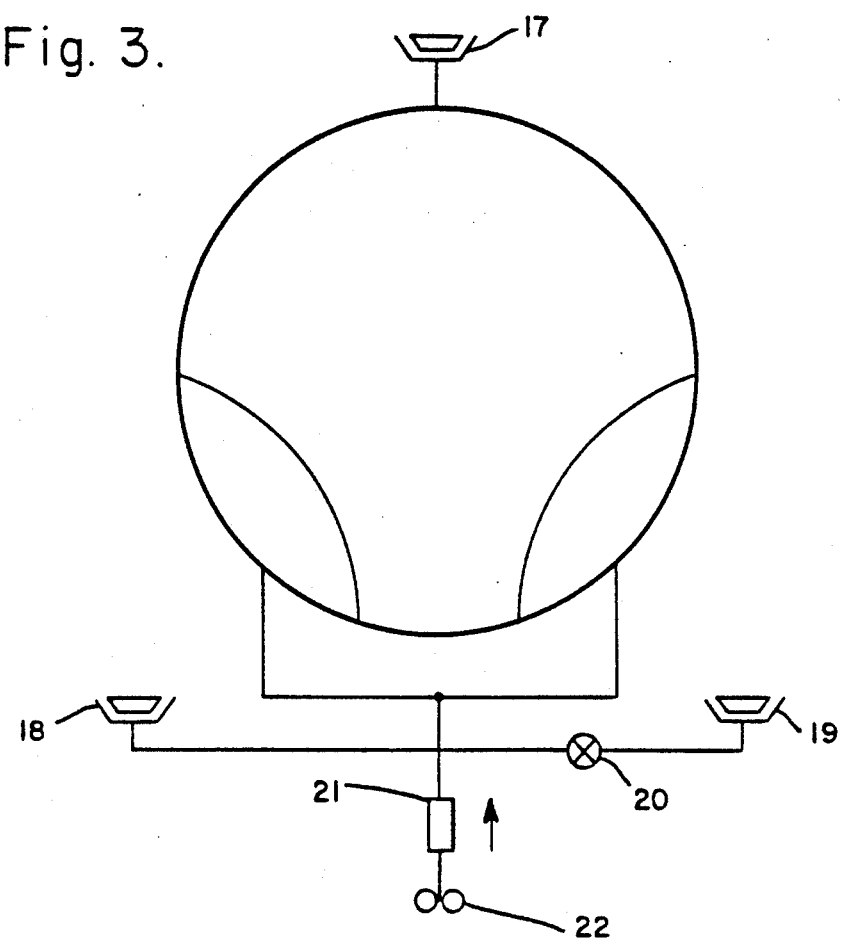

The proposed method would utilize an airship design as shown on FIG. 1, FIG. 2 and FIG. 3. As shown on FIG. 4, varying the pressure in the ballonets and therefore the pressure on the lifting gas, results in a variation in the lift available. It can be shown by analysis that a one percent change in pressure will result in approximately a 2½ percent change in the lift available. This occurs because both the volume of the lifting gas is changed and the weight of air in the ballonets is changed.

A description of how the proposed airship design would be used to transport cargo from point (A) to point (B) will illustrate how it would function.

Figure 4:
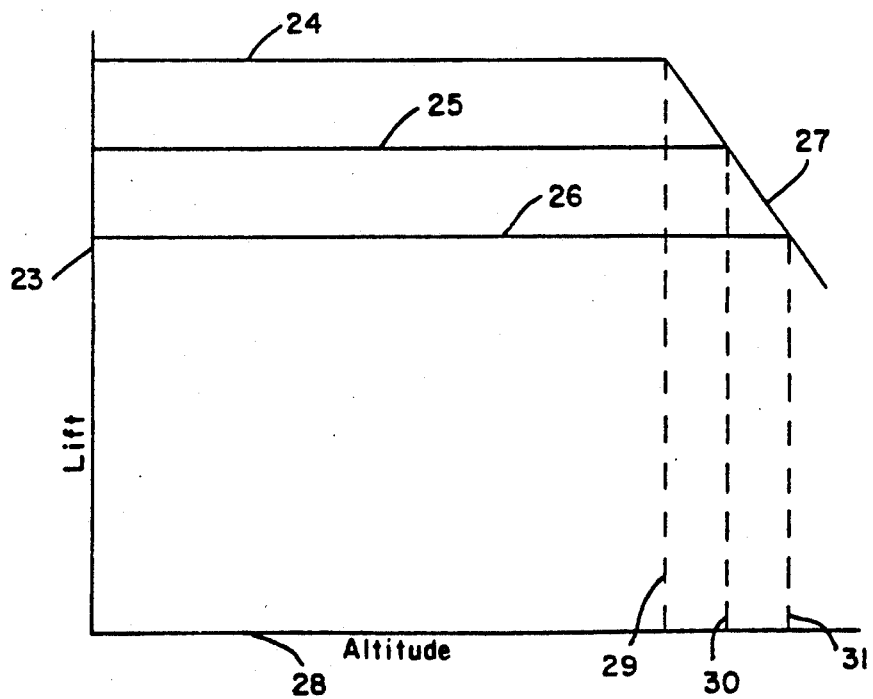

The airship would begin at point (B) with the water ballast tanks filled sufficiently to arrive at the lift required line 25 on FIG. 4. The cargo compartment would be empty and the airship would be secured to the ground. The airpump 22 on FIG. 3 would be running and valve 20 on FIG. 3 would be closed. This would result in the lift available being line 26 of FIG. 4. With the lift available being less than the lift required and the airship being secured to the ground, the airship would be able to withstand the highest ground winds expected without having to be placed in a protective building.

When the airship is ready for flight, the engines would be started, the airship hold-downs would be released, and valve 20 on FIG. 4 would be opened. The lift available would then become line 24 on FIG. 4. With the lift available greater than the lift required, the airship would begin to climb until altitude 30 on FIG. 4 is reached. At altitude 29 on FIG. 4, the ballonets would become empty because the lifting gas would expand. The airship would then continue to climb at a slower rate from altitude 29 to altitude 30 where the lift available would equal the lift required. A down-draft would move the airship along line 27 on FIG. 4 to a lower altitude. This would cause the lift available to become greater than the lift required and would cause the airship to return to altitude 30 when the downdraft ended. Similarly, an updraft would cause the airship to move to a higher altitude along line 27. This would cause the lift available to be less than the lift required and would cause the airship to return to altitude 30 when the updraft ended.

With the airship stabilized at altitude 30 on FIG. 4, the airship would be headed to point (A). When the airship arrives over point (A), valve 20 on FIG. 3 would be closed, bringing the lift available to line 26 on FIG. 4. With the lift available being less than the lift required, the airship would descend and land at point (A). For landing, the airship would be maneuvered over the landing place and headed into the prevailing wind. The engines would be adjusted to maintain the airship over the landing place and the airship would slowly come to rest at the landing place, where it would be secured to the ground.

Cargo would be loaded into the cargo compartment and enough water ballast would be removed to bring the lift required to lien 25 on FIG. 4. The engines would be started and valve 20 on FIG. 3 would be opened. The airship would again climb to altitude 30 on FIG. 4 and would be returned to point (B) to discharge the cargo.

of course, the present invention is not intended to be restricted to any particular form or arrangement, or any specific embodiment disclosed herein, or any specific use, since the same may be modified in various particulars or relations without departing from the spirit or scope of the claimed invention herein above shown and described of which the method shown is intended only for illustration and for disclosure of an operative embodiment and not to show all the various forms of modification in which the invention might be embodied.

The invention has been described in considerable detail in order to comply with the present laws by providing a full public disclosure of at least one of its forms. However, such detailed description is not intended in any way to limit the broad features or principles of the invention, or the scope of patent monopoly to be granted.

What I claim is:

1. A non-rigid pressurized airship comprising:
    (a) a single gas cell extending substantially the full length of said airship,
    (b) a pair of ballonets, each mounted adjacent said gas cell and extending along a respective side of said gas cell,
    (c) an envelope enclosing said gas cell and said ballonets,
    (d) a water ballast compartment suspended from said envelope,
    (e) a cargo compartment suspended from said water ballast compartment,
    (f) a least one engine mounted to drive said airship and
    (g) a weighing means for measuring the weight of the cargo in said cargo compartment and the weight of water in said water ballast compartment to determine the lift required.

2. The airship of claim 1 further comprising a control means consisting of:
    (a) an air pump,
    (b) a high pressure relief valve,
    (c) a low pressure relief valve,
    (d) conduit means connecting said air pump to supply air to said ballonets and to both of said pressure relief valves and
    (e) a shutoff valve connected in said conduit means between said air pump and said low pressure relief valve.

3. The low pressure relief valve of claim 2 with means to maintain a pressure differential in said ballonets to preserve airship rigidity and to keep the lift available greater than said lift required up to slightly above the airship pressure height.

4. The high pressure relief valve of claim 2 with means to maintain a pressure differential in said ballonets to keep the lift available less than said lift required.

5. The airship of claim 1 wherein:
    said envelope is formed of material having sufficient strength to enable the airship to rise above the pressure height to an altitude where the lift available is equal to the lift required.

6. The airship of claim 1 wherein:
    the center of gravity of said airship is located sufficiently below the center of lift to produce a large static longitudinal stability such that effects of updrafts and downdrafts on the pitch attitude of said airship are minimized.

* * * * *

UNITED STATES PATENT AND TRADEMARK OFFICE

Patent No.: 5,143,322

Dated: September 1, 1992

Inventor(s): Earl W. Mason

It is certified that error appears in the above-identified patent and that said Letters Patent is hereby corrected as shown below:

On Title Page: Item [76]     change "5460 White Oak Ave. A232" to "17914 Magnolia Blvd. #312"

Col. 3, line 50 change "compartment" to "compartments"

Col. 3. line 50, after "cable" add "connecting the cargo compartment to the water ballast"

Col. 4, line 57, change "lien" to "line"

Col. 4, line 61, change "of" to "Of"

Col. 5, line 26, change "a" to "at"

Signed and Sealed this

Ninth Day of February, 1993

*Attest:*

STEPHEN G. KUNIN

*Attesting Officer*     *Acting Commissioner of Patents and Trademarks*